Sept. 9, 1947.    V. A. HOOVER    2,427,282
WOUND ARMATURE FOR ELECTRIC MACHINES
Filed Nov. 6, 1943

Inventor
Vaino A. Hoover
By Samuel Scrivener Jr.
Attorney

Patented Sept. 9, 1947

2,427,282

UNITED STATES PATENT OFFICE 2,427,282

WOUND ARMATURE FOR ELECTRIC MACHINES

Vaino A. Hoover, Los Angeles, Calif., assignor to Electrical Engineering and Manufacturing Corporation, Los Angeles, Calif., a corporation of California Application November 6, 1943, Serial No. 509,294

1 Claim. (Cl. 171—206)

This invention relates in general to dynamo-electric machines and, more particularly, to the wound rotors of such machines and, for the purposes of this application, will be described as applied to the armature of an electric motor. The general structure and arrangement of such armatures is very well known and comprises a slotted metallic stack carrying a plurality of coils of wire, and a segmented commutator to which electric energy is supplied by stationary brushes and to the respective segments of which the ends of the armature windings are attached.

The invention here disclosed and claimed is intended to provide an improved armature structure in which the coils of wire are so wound on the armature frame that better balance and distribution of weight and bulk is achieved than has been possible with known methods of winding and in which minimum space is required for the end turns of the coils. A further object of the invention has been to provide unitary means for positively holding the ends of the coils of the armature winding in both radial and axial directions, and for positively supporting such ends from displacement by the centrifugal force developed by high-speed rotation of the armature. A still further object has been to provide a method of winding armatures which is quicker and simpler than known methods.

Other objects and features of novelty of the invention will be made apparent by the following description and the annexed drawings which, it will be understood, are only illustrative of the invention and impose no limitation thereon not imposed by the appended claim.

Figure 1:
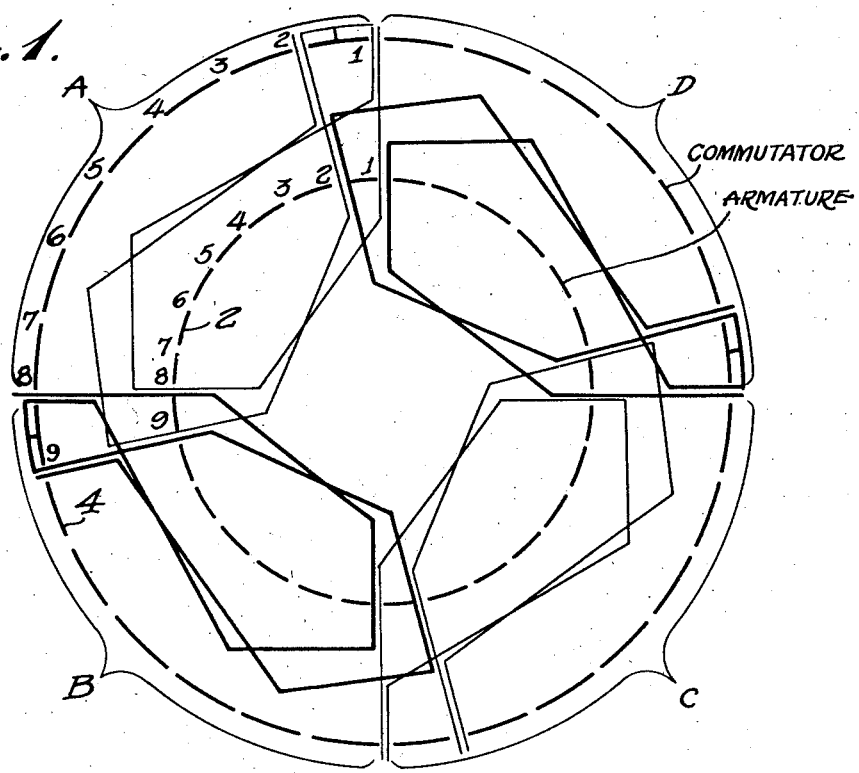
Figure 2:
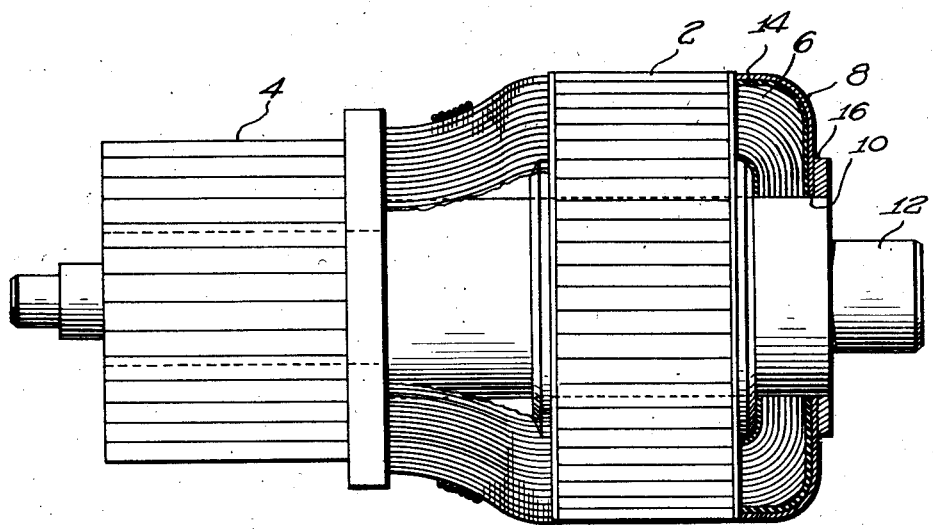

Referring to the drawings, in which similar reference numerals refer to like parts, Fig. 1 is a diagram illustrating the method of winding according to the invention, and Fig. 2 is a longitudinal view of an armature showing the winding retaining means according to the invention.

In carrying out the method according to the invention, if the armature of a machine having $x$ poles, $n$ armature slots and $n$ commutator riser slots is to be wound, the armature slots will first be divided into $x$ groups of adjacent slots and the commutator riser will be divided into $x$ groups of adjacent slots, the groups of commutator riser slots being aligned with those of the armature slots. A first layer of windings is placed by beginning a winding in each slot of alternate groups, i. e. groups which are separated by one pole pitch. The winding laid in each of these slots will be extended through a slot spaced one pole ($n/x$ slots) away, whereby a single winding will be laid in each armature slot. A second layer of windings is now laid by beginning a winding in each slot of each group intermediate the aforesaid alternate groups and each of said windings will be extended through a slot spaced one pole ($n/x$ slots) away.

In Fig. 1 of the drawings there is diagrammatically illustrated the method according to the invention of winding the armature of a four-pole machine having twenty-eight armature slots and twenty-eight commutator riser slots. An armature 2 and a commutator 4, both having twenty-eight slots, are represented in that figure. Four groups of coils are shown, these being designated A, B, C and D and being shown alternately in light and heavy lines, only two wires of each group being shown in order to avoid confusion of the drawing. Each of these groups comprises seven coils and each coil is wound by placing one end of the wire in a slot in the commutator riser, then passing the wire through the seventh removed armature slot, then through the armature slot opposite the slot in the commutator riser in which the end of the wire is placed and then leading the wire back to the commutator slot in which the end of the wire is placed. Thus, wire A1 is wound by placing its one end in commutator riser slot 1, and then leading it through armature slot 8 and armature slot 1, and finally placing its end in commutator riser slot 1 with the other end of the wire. While only one turn about the armature is included in this description more may be made, in which case the wire A1 would be led successively through armature slots 8 and 1. The described procedure is repeated with wires A2, A3 . . . A8. At the same time, and before groups B and D are wound, group C, which is diametrically opposite to group A, is wound, the same described procedure being followed. It will be seen that when groups A and C have been wound, one-half of the commutator riser slots and all of the armature slots will have one layer therein. Groups B and D, which are diametrically-opposed, are now wound in the described manner in order to place a second layer in all of the armature slots. Other layers may be placed by following the described procedure.

It will be understood that the connections between the ends of the coils and the manner in which such ends are connected to the commutator risers, may be carried out in any suitable manner to provide the type of winding desired, Fig. 1 illustrating one conventional manner for effecting such connections.

While the invention is described particularly in connection with a rotor having twenty-eight commutator slots and twenty-eight armature slots, it will be obvious that it may be applied to rotors having any number of armature and commutator slots.

The described method is particularly advantageous with respect to the distribution of weight and bulk of the wire loops 6 at the end of the armature which is removed from the commutator, and causes an entirely even distribution of weight and bulk of these wires, whereby the required balancing of the rotary assembly is considerably reduced and the use of a cover which may be of standard size and shape is permitted. Further, the method according to the invention is quicker and simpler than known methods and, in addition, it has been found that the wire end loops of armatures wound by the invented method occupy considerably less room than those wound by prior art methods.

The invention also provides means for enclosing and supporting the wire loops 6 at the drive end of the armature, and such means comprise the unitary cup-shaped member 8 having an opening 10 at the center of its bottom portion by which it is slipped on the armature shaft 12 in such a way that it completely encloses the wire loops 6. In order to prevent grounding or short-circuiting of the armature windings upon rupture or disintegration of the insulating means of the wire loops 6, electrically insulating means, such as glass fabric 14, is interposed between the loops and the cup 8 and, in addition, the interior of the cup may be treated with liquid insulating material. The winding retaining cup may be held in assembled position on the armature shaft by suitable means such as the retaining ring 16 which is pressed on the shaft.

While I have described various embodiments and features of my invention, other embodiments and features thereof will occur to those skilled in the art, as well as modifications of those disclosed, all of which may be done without departing in any way from the spirit or scope of the invention, for the limits of which reference must be had to the appended claim.

What is claimed is:

The method of winding an armature for a dynamo-electric machine having $x$ poles, $n$ armature slots and $n$ commutator riser slots, which consists in dividing the armature slots into $x$ sequential groups, dividing the commutator riser slots into $x$ sequential groups each of which is aligned with one of the groups of armature slots, winding the slots of alternate groups, and finally winding the slots of the groups intermediate the alternate groups, each winding being made by leading a wire from a commutator riser slot to and through the armature slot which is spaced $n/x$ slots away from said commutator riser slot, then to and through the armature slot aligned with said commutator riser slot, and then into said commutator riser slot.

VAINO A. HOOVER.

REFERENCES CITED

The following references are of record in the file of this patent:

UNITED STATES PATENTS

| Number | Name | Date |
|---|---|---|
| 1,039,307 | McElroy | Sept. 24, 1912 |
| 1,705,726 | Fletcher | Mar. 19, 1925 |
| 1,769,063 | Kimman | July 1, 1930 |

OTHER REFERENCES

Electrical Engineering, Dawes, vol. 1, page 235, published by McGraw-Hill, N. Y., 1920.